United States Patent
Mito et al.

(10) Patent No.: US 8,634,473 B2
(45) Date of Patent: Jan. 21, 2014

(54) VIDEO IMAGE PROCESSING APPARATUS CAPABLE OF PROCESSING HIERARCHICALLY-ENCODED VIDEO DATA SUBJECTED TO HIERARCHICAL CODING AND CONTROL METHOD THEREFOR

(75) Inventors: Koji Mito, Kawasaki (JP); Atsushi Mizutome, Miura-gun (JP)

(73) Assignee: Canon Kabushiki Kaisha, Tokyo (JP)

(*) Notice: Subject to any disclaimer, the term of this patent is extended or adjusted under 35 U.S.C. 154(b) by 359 days.

(21) Appl. No.: 13/075,724

(22) Filed: Mar. 30, 2011

(65) Prior Publication Data

US 2011/0243252 A1 Oct. 6, 2011

(30) Foreign Application Priority Data

Apr. 1, 2010 (JP) ................................. 2010-085361

(51) Int. Cl.
*H04N 7/50* (2006.01)
*H04L 7/033* (2006.01)

(52) U.S. Cl.
USPC ................. 375/240.24; 375/220; 375/240.13; 375/240.26

(58) Field of Classification Search
USPC ........................................ 375/240.11–240.26
See application file for complete search history.

(56) References Cited

U.S. PATENT DOCUMENTS

2010/0002069 A1\* 1/2010 Eleftheriadis et al. ..... 348/14.08

FOREIGN PATENT DOCUMENTS

| JP | 2001-136371 | \* | 5/1999 | ............... H04N 1/00 |
| JP | 2001-136371 A | | 5/2001 | |
| JP | 2006-067576 A | | 3/2006 | |

OTHER PUBLICATIONS

Method and System for Communicating Still Picture, Hitachi INT Electric Inc, May 1999, Japanese Patant #JP2001-136371.\*

\* cited by examiner

*Primary Examiner* — Joseph Ustaris
*Assistant Examiner* — Maryam Nasri
(74) *Attorney, Agent, or Firm* — Canon USA Inc. IP Division

(57) ABSTRACT

A video image processing apparatus outputs encoded video data which has been hierarchically encoded to a reproducing apparatus connected thereto in a communicatable manner. The video image processing apparatus includes a conversion unit configured to, if a high-resolution layer with a resolution equal to or greater than a base layer and a field of view wider than the base layer exists, perform resolution conversion processing to render video data corresponding to the high-resolution layer at least equal to or less than the display resolution, a coding unit configured to perform hierarchical coding on video data corresponding to the high-resolution layer subjected to resolution conversion processing by the conversion unit, and video data corresponding to each of the plurality of resolution layers other than the high-resolution layer.

16 Claims, 6 Drawing Sheets

FIG.4A
LAYER C (RESOLUTION: 1920 × 1080)
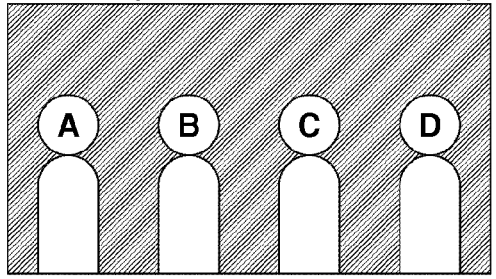
LAYER B (RESOLUTION: 1024 × 576)
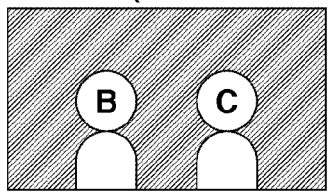
LAYER A (RESOLUTION: 320 × 180)
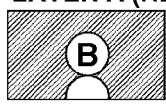
FIG.4B
LAYER F (RESOLUTION: 1920 × 1080)
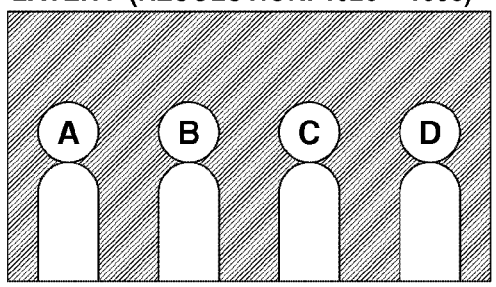
LAYER E (RESOLUTION: 1024 × 576)
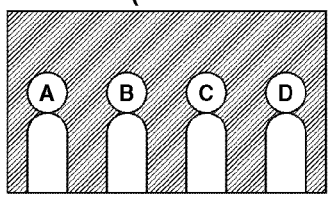
LAYER D (RESOLUTION: 320 × 180)
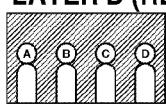

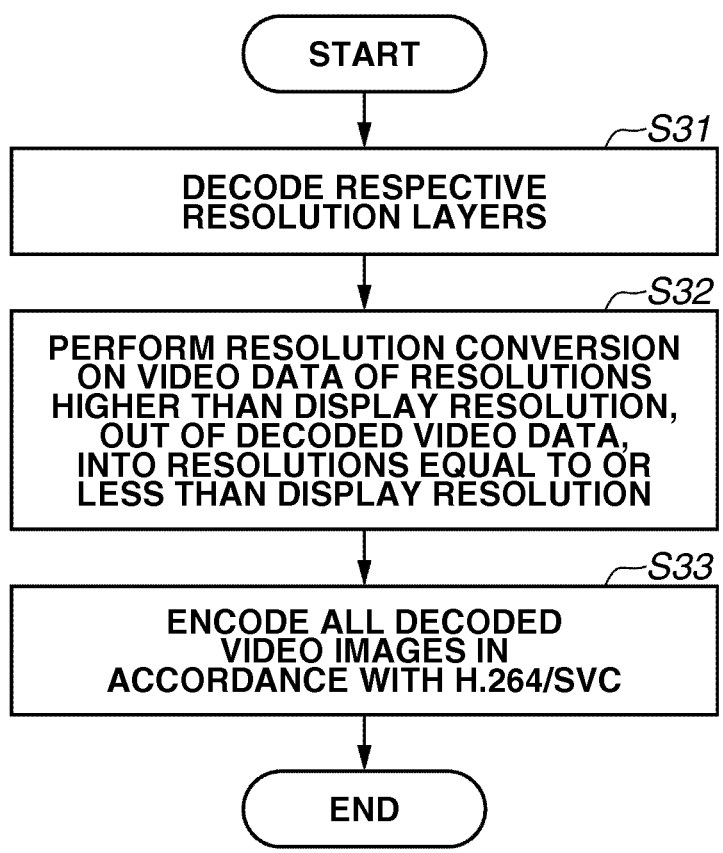

FIG.6A
LAYER C' (RESOLUTION: 1024 × 576)
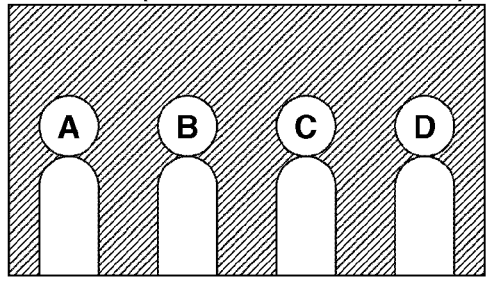
LAYER B (RESOLUTION: 1024 × 576)
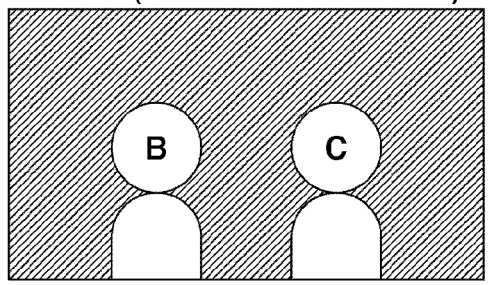
LAYER A (RESOLUTION: 320 × 180)
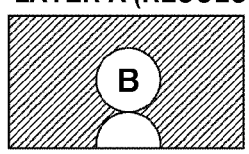
FIG.6B
LAYER E (RESOLUTION: 1024 × 576)
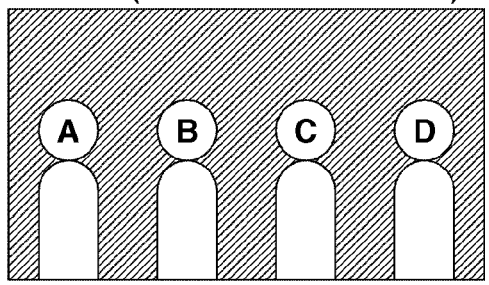
LAYER D (RESOLUTION: 320 × 180)
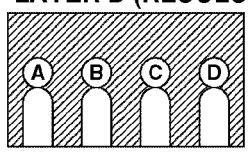

VIDEO IMAGE PROCESSING APPARATUS CAPABLE OF PROCESSING HIERARCHICALLY-ENCODED VIDEO DATA SUBJECTED TO HIERARCHICAL CODING AND CONTROL METHOD THEREFOR

BACKGROUND OF THE INVENTION

1. Field of the Invention

The present invention relates to a video image processing apparatus that transfers hierarchically-encoded video data in which a plurality of video data with different fields of view has been subjected to hierarchical coding, to an external reproducing apparatus, and a control method therefor.

2. Description of the Related Art

In recent years, a function of transferring video data stored in a recording device such as a hard disk recorder to a reproducing apparatus such as a portable terminal has come into wide use. In such a video data transferring function, a technique for transferring video data matched to a capability of the reproducing apparatus at a transfer destination is being studied. Japanese Patent Application Laid-Open No. 2001-136371 discusses a technique for converting video data into resolutions suitable for the reproducing apparatus at the transfer destination according to the acquired information by acquiring information of display resolution from a reproducing apparatus at a transfer destination.

Japanese Patent Application Laid-Open No. 2006-067576 discusses a technique for transferring video data as it is, if the video data is suitable for reproduction in the reproducing apparatus at the transfer destination, and for transferring by reencoding the video data, if not suitable.

Transferring the video data hierarchically-encoded by the hierarchical coding technology specified in H.264/Scalable Video Coding (SVC) standard or the like while using such video data transferring function is also conceivable.

Video data encoded in accordance with the H.264/SVC standard contains a plurality of resolution layers (video data with a plurality of resolutions). For this reason, in a case where the video data encoded in accordance with the H.264/SVC standard is transferred to external reproducing apparatuses, the video data with resolutions matched to the reproducing apparatus at the transfer destination can be transferred, by deleting unnecessary resolution layers in the reproducing apparatus at the transfer destination. However, in the H.264/SVC standard, since different fields of view, that are ranges of video images to be displayed, can be set according to a resolution layer, there is a case where the video data is hierarchically-encoded by a plurality of layers with resolutions and fields of view which are both different from one another. In this case, if the layer is deleted just because it is an unnecessary resolution layer, video image with a field of view of the deleted layer cannot be reproduced.

In other words, if the video image is transferred by deleting layers using information of resolutions, a problem may appear that types of fields of view of the video data which can be reproduced by the reproducing apparatus at the transfer destination will be restricted, depending on the deleted layers.

On the other hand, as a solution for the above-described problem, if the hierarchically-encoded video data is directly transferred as it is to the external reproducing apparatuses, without deleting the layers, even the video data with a resolution exceeding display capability of the reproducing apparatus may be transferred in some cases, depending on a configuration of the layers. Accordingly, it is inefficient to transfer the hierarchically-encoded video data as it is, and it causes a problem in some cases that it increases transfer time to the reproducing apparatus, or presses storage capacity of the reproducing apparatus. In the techniques described in the above-described patent document, a method for solving these issues is not discussed.

SUMMARY OF THE INVENTION

The present invention provides a video image processing apparatus that generates video data for transfer, to contain the video data having a resolution suitable for display capability of a reproducing apparatus at a transfer destination, and having all fields of view, for transferring hierarchically-encoded video data to an external reproducing apparatus, and provides a control method for the video image processing apparatus.

According to an aspect of the present invention, a video image processing apparatus outputs encoded video data which has been hierarchically encoded to a reproducing apparatus connected thereto in a communicatable manner. The video image processing apparatus includes an acquisition unit configured to acquire display resolution information of a display unit in the reproducing apparatus, a determination unit configured to determine whether a high-resolution layer with a resolution equal to or greater than that of the base layer and a field of view wider than that of the base layer exists, among layers at upper level than the base layer, according to resolution information and field of view information of each of the plurality of resolution layers, taking a resolution layer corresponding to video data having a resolution equal to the display resolution or closest to the display resolution, among video data corresponding to each of a plurality of resolution layers contained in encoded video data to be transferred to the reproducing apparatus, as a base layer, a conversion unit configured to, if the determination unit determines that a high-resolution layer with a resolution equal to or greater than that of the base layer and a field of view wider than that of the base layer exists, perform resolution conversion processing to render video data corresponding to the high-resolution layer at least equal to or less than the display resolution, a coding unit configured to perform hierarchical coding on video data corresponding to the high-resolution layer subjected to resolution conversion processing by the conversion unit, and video data corresponding to each of the plurality of resolution layers other than the high-resolution layer, and an output unit configured to output encoded video data which has been encoded by the coding unit to the reproducing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4A illustrates an example of video data having different fields of view encoded in accordance with the H.264/SVC standard according to the first exemplary embodiment of the present invention.

FIG. 4B illustrates an example of video data having different resolutions encoded in accordance with the H.264/SVC standard according to the first exemplary embodiment of the present invention.

FIG. 5 is a flowchart for explaining about reencoding processing in the video image processing apparatus according to the first exemplary embodiment of the present invention.

FIG. 6A illustrates an example of video data after reencoding operation, out of video data having different fields of view encoded in accordance with the H.264/SVC standard according to the first exemplary embodiment of the present invention.

FIG. 6B illustrates an example of video data after reencoding operation, out of video data having different resolutions encoded in accordance with the H.264/SVC standard according to the first exemplary embodiment of the present invention.

DESCRIPTION OF THE EMBODIMENTS

Various exemplary embodiments, features, and aspects of the invention will be described in detail below with reference to the drawings.

Figure 1:
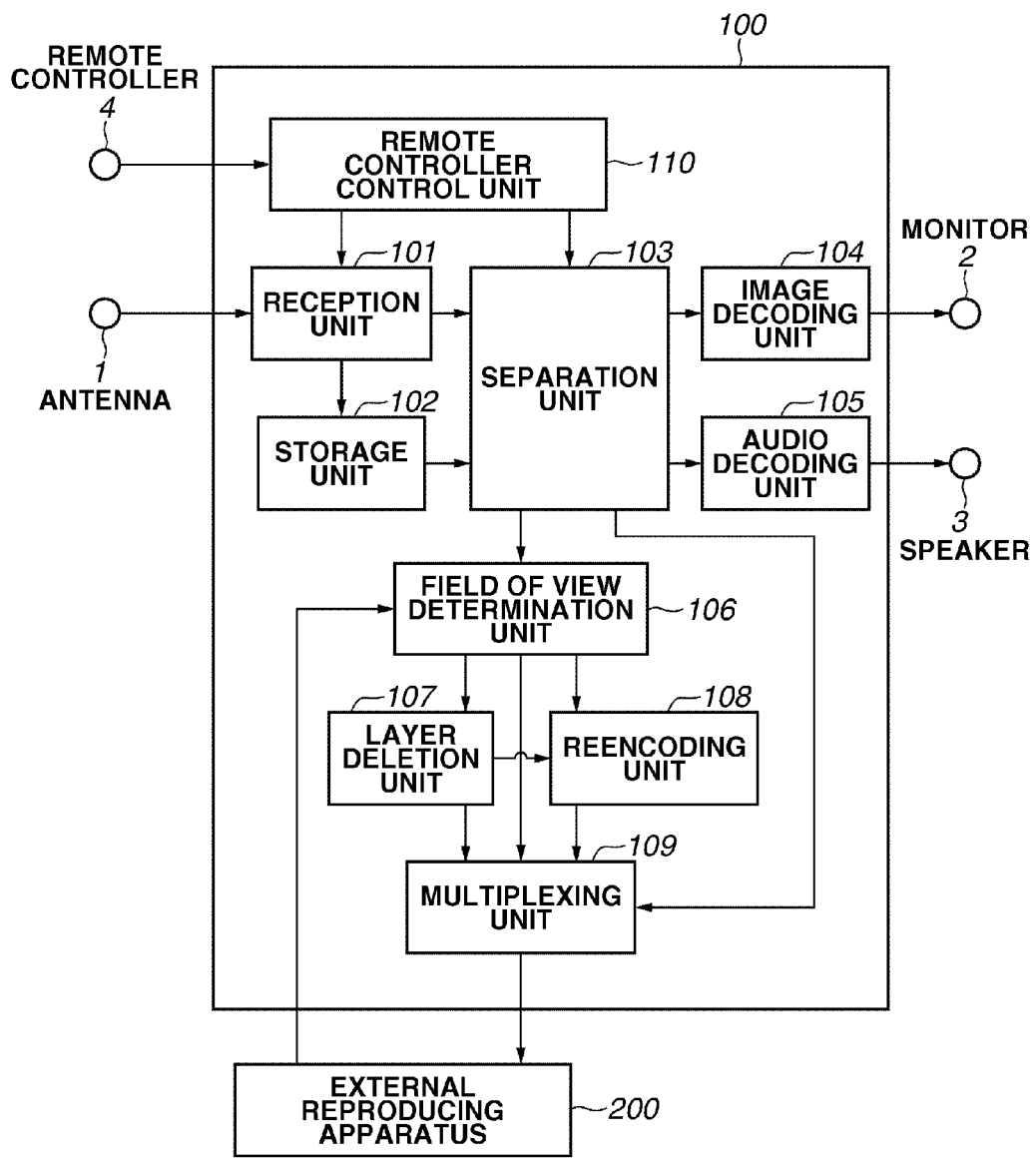
FIG. 1 is a block diagram of a schematic configuration of a video image processing apparatus according to a first exemplary embodiment of the present invention.

In the first exemplary embodiment, encoded video data is transferred from a video image processing apparatus 100 to an external reproducing apparatus 200 illustrated in FIG. 1. In the video image processing apparatus 100 and the external reproducing apparatus 200, the encoded video data which has been encoded in accordance with the H.264/SVC standard can be decoded, and can be displayed on a display unit.

The encoded video data which has been encoded in accordance with the H.264/SVC standard applied to the first exemplary embodiment contains a plurality of resolution layers having different resolutions as illustrated in FIG. 4B. Moreover, respective resolution layers can be also configured with resolution layers with different fields of view as illustrated in FIG. 4A.

The video image processing apparatus 100 will be described with reference to FIG. 1. The reception unit 101 receives/modulates broadcast wave from an antenna 1, and acquires content data in an MPEG-2 TS format. In the acquired content data, the video data encoded in accordance with the H.264/SVC standard, and audio data encoded in accordance with Advanced Audio Coding (AAC) are multiplexed.

Further, the reception unit 101 stores the received content data in a storage unit 102, based on instructions of a remote controller control unit 110 described below. A separation unit 103 separates the encoded video data and the encoded audio data, from the content data which the reception unit 101 receives, or from the content data stored in the storage unit 102. The separated encoded video data is decoded by a video image decoding unit 104, and decoded video images are displayed on the monitor 2.

The encoded audio data which has been separated is decoded by the audio decoding unit 105, and decoded audio is output from a speaker 3.

Further, the separation unit 103 selects content data to be output from the content data stored in the storage unit 102 to the external reproducing apparatus 200, based on instructions of the remote controller control unit 110, and separates the content data into encoded video data and encoded audio data. The separated encoded video data is output to a field of view determination unit 106, and the separated encoded audio data is output to a multiplexing unit 109.

The field of view determination unit 106 determines whether to output the encoded video data to a layer deletion unit 107, or to the reencoding unit 108, or to the multiplexing unit 109, according to display resolution information acquired from the external reproducing apparatus 200. The details of the field of view determination unit 106 will be described below.

The layer deletion unit 107 deletes resolution layers with higher resolutions than the display resolution of the external reproducing apparatus 200 from the encoded video data output from the field of view determination unit 106. The layer deletion unit 107 outputs video data, from which the resolution layers have been deleted, to the multiplexing unit 109.

The reencoding unit 108 reencodes the encoded video data in accordance with the H.264/SVC standard, so that resolutions of resolution layers of the video data output from the field of view determination unit 106 become equal to or less than the display resolution of the external reproducing apparatus 200. The reencoding unit 108 outputs the encoded video data which is reencoded, to the multiplexing unit 109. The details of reencoding processing in the reencoding unit 108 will be described below.

The multiplexing unit 109 multiplexes the encoded video data output from the layer deletion unit 107, or the reencoding unit 108, or the field of view determination unit 106, and the encoded audio data separated by the separation unit 103, and outputs it to the external reproducing apparatus 200. The external reproducing apparatus 200 and the video image processing apparatus 100 are connected together in a communicatable manner via a communication means (not illustrated).

The remote controller control unit 110 gives instructions such as storage of the content data and reproduction and transfer of the stored content data, to the reception unit 101 or the separation unit 103, based on control signal received from the remote controller 4.

The field of view determination unit 106 determines difference in fields of view of resolution layers contained in the encoded video data which has been encoded in accordance with the H.264/SVC standard. Here, setting of fields of view in the H.264/SVC standard will be described.

In the explanation below, sequence, picture, and slice indicate units of video image coding. The sequence indicates the entire moving image, the picture indicates one sheet of image in the moving image, and the slice indicates further fragmented picture.

In the H.264/SVC standard, field of view can be set for each resolution layer by setting deviation of endpoint between a picture of an upper layer and a picture of a lower layer. More specifically, top-bottom and left-right offset positions between the picture of the upper layer and the picture of the lower layer can be set.

Figure 2:
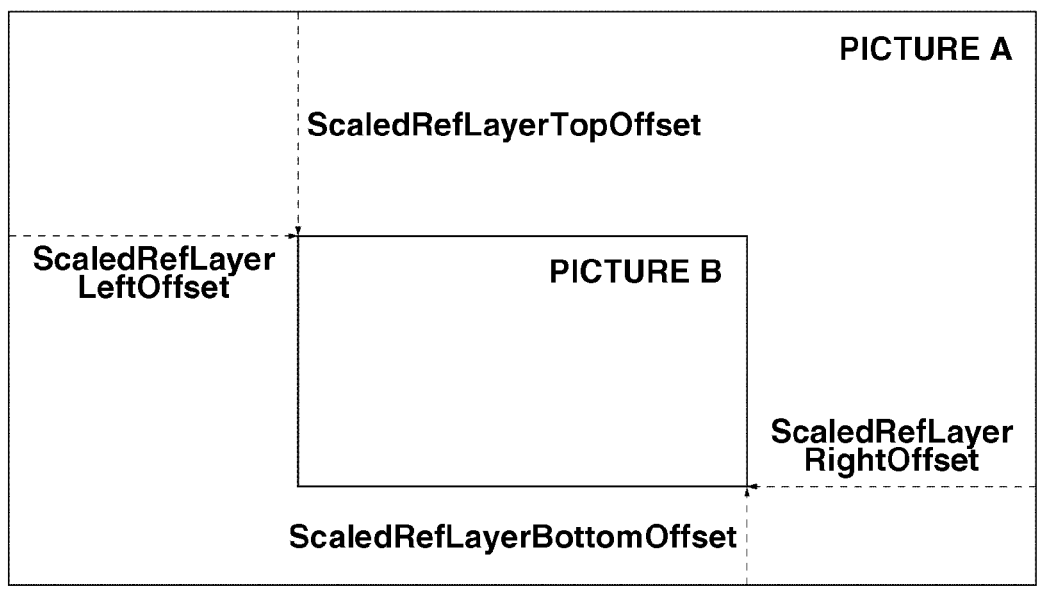
FIG. 2 is a diagram for explaining setting of fields of view between hierarchies in H.264/SVC standard according to the first exemplary embodiment of the present invention.

FIG. 2 illustrates offset information of the picture A (the picture of the upper layer) and the picture B (the picture of the lower layer). The picture A is a picture in which a wider field of view than that of the picture B is set. As illustrated in FIG. 2, the following four pieces of information exists in offset information indicating deviations of frame endpoints between the picture A (the picture of the upper layer) and the picture B (the picture of the lower layer). The offset information described below, is set using sequence parameter set in which information relating to the coding of the entire sequence is set, or slice header in which information relating to the coding of slice is set.

ScaledRefLayerLeftOffset is an offset value in a horizontal direction from top-left endpoint of the picture A to top-left endpoint of the picture B.

ScaledRefLayerTopOffset is an offset value in a vertical direction from top-left endpoint of the picture A to a top-left endpoint of the picture B. ScaledRefLayerRightOffset is an offset value in a horizontal direction from a bottom-right endpoint of the picture A to a bottom-right endpoint of the picture B. ScaledRefLayerBottomOffset is an offset value in a vertical direction from a bottom-right endpoint of the picture to a bottom-right endpoint of the picture B.

In a case where offset information is all zero, it means that the picture A and the picture B have the same field of view. In a case where values of offset information are all positive values, it means that field of view of the picture A is wider than that of the picture B. In other words, as illustrated in FIG. 2, it is a state in which the picture B is contained within the field of view of the picture A. On the other hand, in a case where values of offset information are all negative values, the picture A is contained within the field of view of the picture B.

In field of view determination processing in the field of view determination unit 106, if even one positive value is included in each offset information, it is determined that a field of view of an upper layer is wider than that of a lower layer. In the H.264/SVC standard, a value of width of the lower layer is defined to be equal to a value obtained by subtracting left offset value and right offset value from a value of width of the upper layer. Therefore, a value obtained by subtracting the value of width of the lower layer from the value of width of the upper layer is equal to a value obtained by adding the left offset value and the right offset value. From this fact, if the offset value is positive, the upper layer becomes larger, and if the offset value is negative, the lower layer becomes larger.

Figure 3:
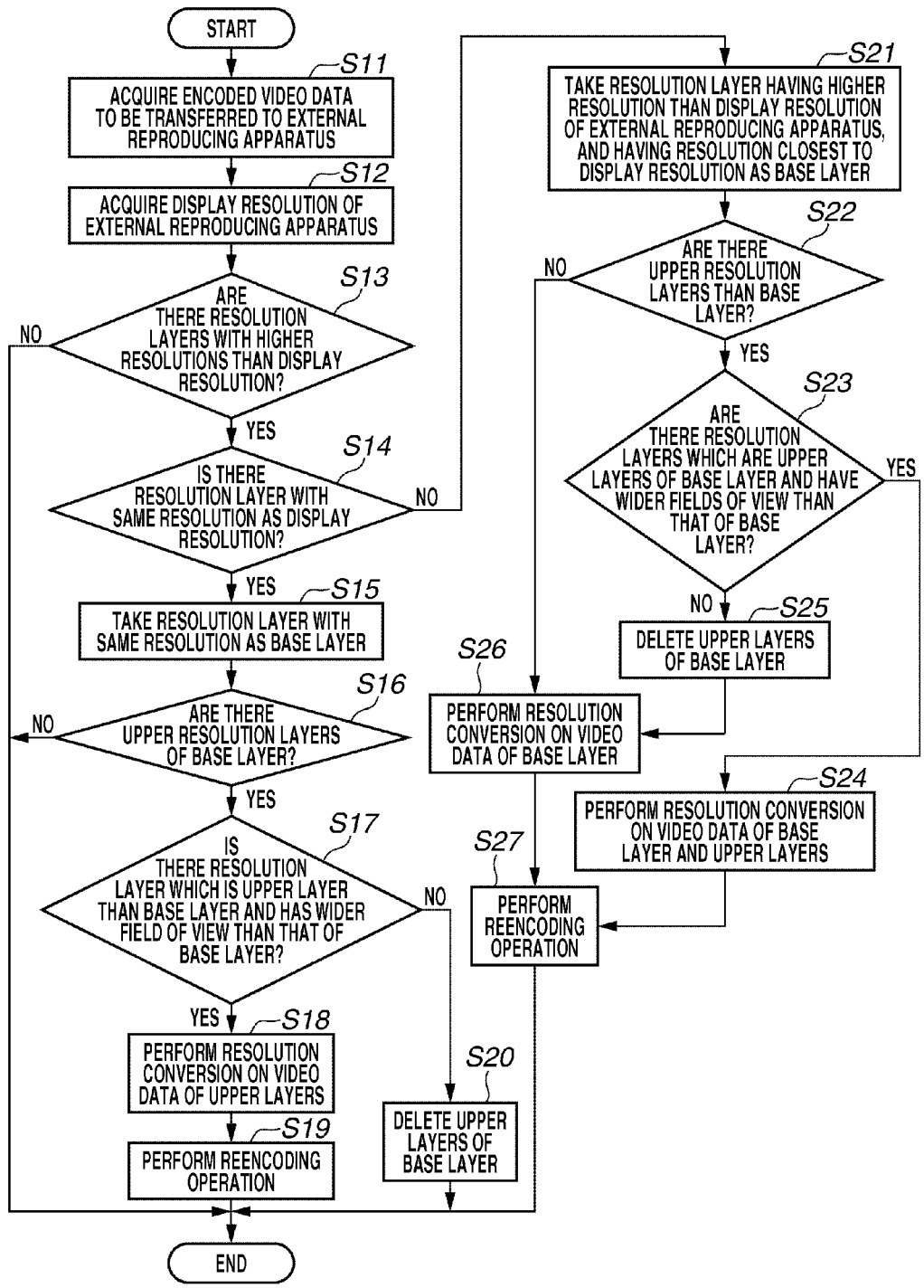
FIG. 3 is a flowchart for explaining a control in the video image processing apparatus according to the first exemplary embodiment of the present invention.

Angle-of-view determination processing in the field of view determination unit 106 will be described with reference to the flowchart FIG. 3.

In the flowchart FIG. 3, a case where video data encoded in accordance with the H.264/SVC standard in a configuration illustrated in FIG. 4 (FIGS. 4A and 4B) is input into the field of view determination unit 106 will be described.

The encoded video data illustrated in FIG. 4A has three types resolution layers: 320×180 pixels (layer A), 1024×576 pixels (layer B), and 1920×1080 pixels (layer C). Also, the encoded video data illustrated in FIG. 4B has three types resolution layers: 320×180 pixels (layer D), 1024×576 pixels (layer E), and 1920×1080 pixels (layer F).

In the case of FIG. 4A, video data of difference between the layers A and B is encoded in the layer B, and video data of difference between the layers B and C is encoded in the layer C. Also, in the case of case FIG. 4B, video data of difference between the layers D and E is encoded in the layer E, and video data of difference between the layers E and F is encoded in the layer F.

In FIG. 4A, the more upper resolution layer, the wider field of view is set, and thus a field of view of the lower layer is contained within a field of view of the upper layer. More specifically, values of offset information between the layer C and the layer B are all positive values, and values of offset information between the layer B and the layer A are also all positive values. The offset information corresponds to field of view information indicating field of view of each resolution layer.

In FIG. 4B, the same field of view is set for all resolution layers. More specifically, values of offset information between the layer E and the layer D are all zero, and values of offset information between the layer F and the layer E are also zero.

In step S11, the field of view determination unit 106 acquires hierarchically-encoded video data to be transferred to the external reproducing apparatus 200, from the separation unit 103.

In step S12, the field of view determination unit 106 acquires information of a display resolution of the external reproducing apparatus 200. For example, if the video image processing apparatus 100 and the external reproducing apparatus 200 are connected to each other via a high-definition multimedia interface (HDMI), information of the display resolution can be obtained by acquiring Extended Display Identification Data (EDID) stored in a memory within the external reproducing apparatus 200.

In step S13, the field of view determination unit 106 determines whether there are resolution layers with higher resolution than the display resolution of the external reproducing apparatus 200, by comparing resolution information of the hierarchically-encoded video data acquired in step S11 with the display resolution. Since a number of pixels per one sheet of frame image data constituting video data of each layer is contained in a Sequence Parameter Set (SPS) as a header for retaining information relating to coding of the entire sequence, this value is used as the resolution information of the hierarchically-encoded video data. If it is assumed that the display resolution of the external reproducing apparatus 200 is 3840×2160 pixels, in an example of the video data illustrated in FIG. 4A, the field of view determination unit 106 determines that a high-resolution layer with higher resolution than the display resolution of the external reproducing apparatus 200 does not exist. Further, if it is assumed that the display resolution of the external reproducing apparatus 200 is 1024×576 pixels, the layer C of 1920×1080 pixels of the video data illustrated in FIG. 4A is a high-resolution layer with higher resolution than the display resolution. Accordingly, the field of view determination unit 106 determines that the high resolution layer with higher resolution than the display resolution exists.

If it becomes apparent that a high-resolution layer with higher resolution than the display resolution of the external reproducing apparatus 200 exists (YES In step S13), then the processing proceeds to step S14. On the other hand, if it becomes apparent that a resolution layer with the same resolution as the display resolution of the external reproducing apparatus 200 does not exist (NO in step S13), the field of view determination unit 106 directly outputs the encoded video data acquired in step S11 as it is to the multiplexing unit 109.

In step S14, the field of view determination unit 106 determines whether a resolution layer with the same resolution as the display resolution of the external reproducing apparatus 200 is included in the encoded video data. If it is assumed that the display resolution of the external reproducing apparatus 200 is 1024×576 pixels, the layer B with the same 1024×576 pixels as the display resolution of the external reproducing apparatus 200 exists, in an example of the video data illustrated in FIG. 4A. Further, if it is assumed that the display resolution of the external reproducing apparatus 200 is 720×480 pixels, a resolution layer with the same resolution as the display resolution of the external reproducing apparatus 200 does not exist, in an example of the video data illustrated in FIG. 4A.

If it becomes apparent that a resolution layer with the same resolution as the display resolution of the external reproducing apparatus 200 exists (YES in step S14), then the processing proceeds to step S15. On the other hand, if it is determined that a resolution layer with the same resolution as the display resolution of the external reproducing apparatus 200 does not exist (NO in step S14), then the processing proceeds to step S21.

In step S15, the field of view determination unit 106 sets a resolution layer with the same resolution as the display resolution of the external reproducing apparatus 200 as a base layer. If the display resolution of the external reproducing apparatus 200 is 1024×576 pixels, the field of view determination unit 106 sets the layer B with 1024×576 pixels as the base layer, in an example of the video data illustrated in FIG. 4A.

In performing reencoding processing described below, if a layer provides the basis for determining whether there exists a high-resolution layer with a resolution equivalent to the display resolution or higher than the display resolution, and a layer having a wider field of view than a resolution layer having a resolution closest to the display resolution, within layers with higher resolutions than a high-resolution layer equivalent to the display resolution of the external reproducing apparatus 200 or showing one level higher resolution than the display resolution, this layer is referred to as a base layer.

In step S16, the field of view determination unit 106 determines whether a resolution layer located at an upper level than the base layer set in step S15 is contained in the encoded video data. In an example of the video data illustrated in FIG. 4A, if it is assumed that the layer B is a base layer, since the layer C exists at upper level than the layer B, an upper high-resolution layer having a resolution higher than that of the base layer exists.

If it is determined that an upper resolution layer than the base layer exists (YES in step S16), the processing proceeds to step S17. On the other hand, if it is determined that an upper resolution layer than the base layer does not exists (NO in step S16), the field of view determination unit 106 directly outputs the video data acquired in step S11 as it is to the multiplexing unit 109.

In step S17, the field of view determination unit 106 determines whether there is a resolution layer for which has wider field of view than that of the base layer is set, from upper resolution layers than the base layer. If the base layer is the layer B in the video data illustrated in FIG. 4A, an upper resolution layer than the base layer is the layer C. In this case, since positive values exist in offset information of the layer B and the layer C, it is determined that a resolution layer for which an field of view wider than that of the base layer is set, exists. If the base layer is the layer E in the video data illustrated in FIG. 4B, an upper resolution layer than the base layer is the layer F. In this case, since offset information of the layer E and the layer F are all zero, it is determined that a resolution layer for which a field of view wider than that of the base layer is set, does not exist.

If the field of view determination unit 106 determines that a resolution layer for which a field of view wider than that of the base layer is set, exists (YES in step S17), the processing proceeds to step S18. On the other hand, if the field of view determination unit 106 determines that a resolution layer for which a field of view wider than that of the base layer is set, does not exist (NO in step S17), the processing proceeds to step S20.

In step S18, the field of view determination unit 106 outputs the encoded video data acquired in step S11 to the reencoding unit 108, and notifies the reencoding unit 108 of information of resolution layers to be subjected to resolution conversion. The reencoding unit 108 performs resolution conversion processing on the notified resolution layers so that resolutions of resolution layers contained in the encoded video data become equal to or less than the display resolution of the external reproducing apparatus 200.

Thereafter, in step S19, video data of all resolution layers including resolution layers subjected to resolution conversion is reencoded using the coding scheme specified in accordance with the H.264/SVC standard. The details of resolution conversion processing and reencoding processing in the reencoding unit 108 will be described below.

In step S20, the field of view determination unit 106 outputs the encoded video data acquired in step S11 to the layer deletion unit 107, and notifies the layer deletion unit 107 of information of the resolution layers to be deleted. The layer deletion unit 107 deletes upper resolution layers than the base layer, out of the video data acquired from the field of view determination unit 106. If the base layer is the layer E, in an example of the video data illustrated in FIG. 4B, the layer deletion unit 107 causes a state in which the resolution layer F at upper level than the layer E is deleted from the video data as illustrated in FIG. 6B.

To delete resolution layers, a method for deleting Network Abstraction Layer (NAL) unit in which includes dependency_id corresponding to resolution layers to be deleted in a header can be used. In the H.264/SVC standard, dependency_id corresponding to identification information of layers is added to each resolution layer. Further, encoded data is stored in NAL unit in slice unit, and dependency_id is included in a header of the NAL unit. Therefore, by deleting the NAL unit which includes dependency_id corresponding to the resolution layers targeted for deletion, it becomes possible to delete the resolution layers targeted for deletion from the encoded video data.

Subsequently, in the reencoding unit 108, resolution conversion processing and reencoding processing on video data encoded in accordance with the H.264/SVC standard will be described with reference to the flowchart in FIG. 5.

In the flowchart in FIG. 5, the video data illustrated in FIG. 4A is reencoded and the video data illustrated in FIG. 6A is generated. In the video data illustrated in FIG. 4A, more upper resolution layer has wider field of view setting. More specifically, the layer C is a video image which shows the panoramic view, the layer B is a partial video image of the layer C, and the layer A is a partial video image of the layer B.

In step S31, the reencoding unit 108 decodes the encoded video data input in step S11. In other words, three pieces of video data consisting of the video data corresponding to the layer A, the video data corresponding to the layer B, and the video data corresponding to the layer C are generated by the decoding operation.

In step S32, the reencoding unit 108 converts video data having higher resolutions than the display resolution of the external reproducing apparatus 200, out of the video data decoded in step S31, into the same resolution as that of the external reproducing apparatus 200. If the display resolution of the external reproducing apparatus 200 is 1024×576 pixels, in an example of the video data illustrated in FIG. 4A, the reencoding unit 108 converts a resolution of the video data corresponding to the layer C from 1920×1080 pixels into 1024×576 pixels. By thus converting the resolution of the layer C, the video data corresponding to a layer C' is generated as illustrated in FIG. 6A. Any scheme may be used for conversion processing of resolutions.

In step S33, the reencoding unit 108 reencodes all decoded video data consisting of decoded video data corresponding to the layer C', decoded video data corresponding to the layer B, and decoded video data corresponding to the layer A, using the coding scheme specified in accordance with the H.264/

SVC standard. Thereafter, the reencoding unit 108 outputs the video data encoded in step S33 to the multiplexing unit 109.

By the above-described processing, the reencoding unit 108 can generate hierarchically-encoded video data which has been regenerated taking a resolution corresponding to the display resolution as an upper limit, even in a case where there is a resolution layer having the same resolution as the display resolution, and located at an upper level than the display layer, and the upper layer is a layer having a wider field of view than that of the base layer.

On the other hand, if there is not a resolution layer having the same resolution as the display resolution (NO in step S14), then in step S21, the field of view determination unit 106 sets a resolution layer having a resolution higher than the display resolution of the external reproducing apparatus 200, and having a resolution closest to the display resolution, as the base layer. If the display resolution of the external reproducing apparatus 200 is 720×480 pixels, the field of view determination unit 106 sets the layer B of 1024×576 pixels as the base layer, in an example of the video data illustrated in FIG. 4A.

In step S22, the field of view determination unit 106 performs determination similar to the processing in step S16. If it is determined that upper resolution layers than the base layer exist (YES in step S22), then the processing proceeds to step S23. On the other hand, if it is determined that upper resolution layers than the base layer do not exist (NO in step S22), then the processing proceeds to step S26.

In step S23, the field of view determination unit 106 performs determination similar to the processing in step S17. If the field of view determination unit 106 determines that a resolution layer for which a field of view wider than the base layer is set exists (YES In step S23), the processing proceeds to step S24. On the other hand, if the field of view determination unit 106 determines that a resolution layer for which a field of view wider than the base layer is set does not exist (NO in step S23), the processing proceeds to step S25.

In step S24, the field of view determination unit 106 outputs the encoded video data acquired in step S11 to the reencoding unit 108, and notifies the reencoding unit 108 of information of resolution layers to be subjected to resolution conversion. The reencoding unit 108 performs resolution conversion so that resolutions of resolution layers contained in the encoded video data become equal to or less than the display resolution of the external reproducing apparatus 200. In the flowchart, in step S21, a resolution layer having a resolution higher than the display resolution, and a resolution closest to the display resolution is taken as the base layer, and in step S22, it is determined that there are upper resolution layers than the base layer in step S22. For this reason, the reencoding unit 108 performs resolution conversion processing so that the base layer and upper resolution layers than the base layer become all equal to or less than the display resolution.

Thereafter, in step S27, the reencoding unit 108, similar to the processing in step S19, reencodes video data of a high-resolution layer subjected to resolution conversion in step S24, and all resolution layers other than the high-resolution layer.

On the other hand, if the field of view determination unit 106 determines that there are no upper resolution layers than the base layer in step S22, only the base layer exceeds the display resolution of the external reproducing apparatus 200. Therefore, in step S26, the field of view determination unit 106 outputs the encoded video data acquired in step S11 to the reencoding unit 108, and notifies the reencoding unit 108 of information of the resolution layers to be subjected to resolution conversion. The reencoding unit 108 performs resolution conversion processing on the notified resolution layers, so that a resolution of the base layer becomes equal to or less than the display resolution of the external reproducing apparatus 200.

Thereafter, in step S27, the reencoding unit 108 reencodes video data of all resolution layers including the resolution layer which has been subjected to resolution conversion using the coding scheme specified in accordance with the H.264/SVC standard. The reencoding unit 108 outputs the encoded video data which has been reencoded to the multiplexing unit 109, and the multiplexing unit 109 performs multiplexing processing with the audio data, and outputs the encoded video data to the external reproducing apparatus 200.

If the field of view determination unit 106 determines that a resolution layer for which a field of view wider than the base layer is set does not exist (NO in step S23), then the processing proceeds to step S25. In step S25, the layer deletion unit 107 performs processing similar to that in step S20, and deletes upper layers of the base layer.

Thereafter, the processing proceeds to step S26, and subsequently, performs processing similar to that in steps S26 and S27 described above.

As described above, in the first exemplary embodiment, in transferring hierarchically-encoded video data to the external reproducing apparatus, the reencoding unit 108 generates video data for transfer, which contain the video data having resolution suitable for display capability of the reproducing apparatus at the transfer destination, and contain the video data having all fields of view. Therefore, when video data is transferred with a resolution suitable for display capability of the reproducing apparatus at the transfer destination, video image with all fields of view can be viewed using the reproducing apparatus at the transfer destination. Even when video images for which different fields of view are set between the resolution layers are transferred to the external reproducing apparatus, video images matched to the display capability of the external reproducing apparatus can be transferred to the external reproducing apparatus in a configuration which enables view of all fields of view.

In the first exemplary embodiment, although the H.264/SVC standard is applied as the hierarchical coding scheme, the present invention is not limited to this hierarchical coding scheme.

In addition, in the first exemplary embodiment, although hierarchically-encoded video data is acquired from broadcast wave, the hierarchically-encoded video data can be also acquired from the Internet or removable media or the like.

In the above-described exemplary embodiment, the field of view determination unit 106, if a resolution layer having a resolution equivalent to the display resolution does not exist, sets a resolution layer with a resolution higher than the display resolution of the external reproducing apparatus 200, and at the same time a resolution layer having a resolution closest to the display resolution as the base layer. However, in the present invention, a resolution layer with a resolution lower than the display resolution, and at the same time a resolution layer having a resolution closest to the display resolution may also be set as the base layer. In this case, the base layer will be subjected to resolution conversion (up-convert) so that a resolution of the base layer is rendered equivalent to the display resolution, and the base layer and resolution layers having resolutions higher than the display resolution will be subjected to resolution conversion (down-convert) so that their resolutions are rendered equivalent to the display resolution.

Also, it is possible to employ a method in which the field of view determination unit 106, if a resolution layer with a resolution equivalent to the display resolution does not exist, adopts a resolution layer in which resolution difference from the display resolution is small, as the base layer, out of resolution layers.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-085361 filed Apr. 1, 2010, which is hereby incorporated by reference herein in its entirety.

What is claimed is:

1. An image processing apparatus that outputs encoded image data which has been hierarchically-encoded to a display apparatus which is connected thereto in a communicatable manner, the image processing apparatus comprising:
   an acquisition unit configured to acquire display resolution information of a display unit of the display apparatus;
   a determination unit configured to determine whether a field of view of the high-resolution layer is wider than a field of view of the base layer if a high-resolution layer with a resolution equal to or higher than the base layer exists according to layer resolution information of each of a plurality of layers and field of view information of each of the plurality of layers, adopting a layer corresponding to image data having a resolution equal to a display resolution of the display unit or a layer corresponding to image data having a resolution closest to the display resolution of the display unit, among image data corresponding to each of the plurality of layers contained in encoded image data to be transferred to the display apparatus, as a base layer;
   a conversion unit configured to, in a case where the determination unit determines that a field of view of a high-resolution layer is wider than a field of view of the base layer if the high-resolution layer with a resolution equal to or higher than the base layer exists, perform resolution conversion processing to the high-resolution layer to render image data corresponding to the high-resolution layer at least equal to or less than the display resolution;
   a coding unit configured to perform hierarchical coding on image data corresponding to the high-resolution layer subjected to resolution conversion processing by the conversion unit, and image data corresponding to each of a plurality of layers other than the high-resolution layer; and
   an output unit configured to output encoded image data which has been encoded by the coding unit to the display apparatus,
   wherein the conversion unit does not perform the resolution conversion processing, in a case where the determination unit determines that a field of view of a high-resolution layer is equal to or lower than a field of view of the base layer if the high-resolution layer with a resolution equal to or higher than the base layer exists.

2. The image processing apparatus according to claim 1, further comprising:
   a deletion unit configured to delete the high-resolution layer which is determined to be equal to or lower than the field of view of the base layer, in a case where the determination unit determines that the field of view of the high-resolution layer is equal to or lower than the field of view of the base layer if the high-resolution layer with the resolution equal to or higher than the base layer exists.

3. The image processing apparatus according to claim 1, wherein in a case where a resolution of the base layer is a resolution closest to the display resolution, and a resolution of a larger value than the display resolution, the conversion unit performs resolution conversion processing to render a resolution of the base layer equal to or less than the display resolution.

4. The image processing apparatus according to claim 1, wherein in a case where the determination unit determines that the field of view of the high-resolution layer is equal to or lower than the field of view of the base layer if the high-resolution layer with the resolution equal to or higher than the base layer exists, an encoded image data corresponding to the high-resolution layer determined to be equal to or lower than a field of view of the base layer is not output to the display apparatus by the output unit.

5. The image processing apparatus according to claim 1, wherein the encoded image data which has been hierarchically-encoded is image data which has been hierarchically-encoded based on Scalable Video Coding standard.

6. The image processing apparatus according to claim 1, wherein in a case where the layer corresponding to the image data having the resolution equivalent to the display resolution does not exist among the plurality of layers, the base layer is a layer corresponding to image data having a resolution higher than the display resolution and closest to the display resolution.

7. The image processing apparatus according to claim 1, wherein in a case where the layer corresponding to the image data having the resolution equivalent to the display resolution does not exist among the plurality of layers, the base layer is a layer corresponding to image data having a resolution lower than the display resolution and closest to the display resolution.

8. The image processing apparatus according to claim 1, wherein in a case where the layer corresponding to the image data having the resolution closest to the display resolution is the base layer, resolution conversion processing is performed to the base layer so that the resolution of the base layer is substantially equivalent to the display resolution.

9. A control method for an image processing apparatus that outputs encoded image data which has been hierarchically encoded to a display apparatus connected thereto in a communicatable manner, the method comprising:
   acquiring display resolution information of a display unit of the display apparatus;
   determining whether a field of view of the high-resolution layer is wider than a field of view of the base layer if a high-resolution layer with a resolution equal to or higher than the base layer exists according to layer resolution information of each of a plurality of layers and field of view information of each of the plurality of layers, adopting a layer corresponding to image data having a resolution equal to a display resolution of the display unit or a layer corresponding to image data having a resolution closest to the display resolution of the display unit, among image data corresponding to each of the plurality of layers contained in encoded image data to be transferred to the display apparatus, as a base layer;
   in a case where the determining determines that a field of view of a high-resolution layer is wider than a field of view of the base layer if the high-resolution layer with a resolution equal to or higher than the base layer exists, converting for performing resolution conversion processing to the high-resolution layer to render image data corresponding to the high-resolution layer at least equal to or less than the display resolution;

hierarchically encoding image data corresponding to the high-resolution layer which has been subjected to resolution conversion processing by the converting, and image data corresponding to each of a plurality of layers other than the high-resolution layer; and outputting encoded image data which has been encoded by the encoding to the display apparatus, wherein the conversion does not perform the resolution conversion processing, in a case where the determination determines that a field of view of a high-resolution layer is equal to or lower than a field of view of the base layer if the high-resolution layer with a resolution equal to or higher that the base layer exists.

10. The control method for the image processing apparatus according to claim 9, further comprising:

deleting the high-resolution layer which is determined to be equal to or lower than the field of view of the base layer, in a case where the determining determines that the field of view of the high-resolution layer is equal to or lower than the field of view of the base layer if the high-resolution layer with the resolution equal to or higher than the base layer exists.

11. The control method for the image processing apparatus according to claim 9, wherein in a case where a resolution of the base layer is a resolution closest to the display resolution, and is a resolution of larger value than the display resolution, resolution conversion processing is performed in the converting to render a resolution of the base layer equal to or less than the display resolution.

12. The control method for the image processing apparatus according to claim 9, wherein in a case where the determining determines that the field of view of the high-resolution layer is equal to or lower than the field of view of the base layer if the high-resolution layer with the resolution equal to or higher than the base layer exists, an encoded image data corresponding to the high-resolution layer determined to be equal to or lower than a field of view of the base layer is not output to the display apparatus.

13. The control method for the image processing apparatus according to claim 9, wherein the encoded image data which has been hierarchically-encoded is image data which has been hierarchically-encoded based on Scalable Video Coding standard.

14. The control method for the image processing apparatus according to claim 9, wherein in a case where the layer corresponding to the image data having the resolution equivalent to the display resolution does not exist among the plurality of layers, the base layer is a layer corresponding to image data having a resolution higher than the display resolution and closest to the display resolution.

15. The control method for the image processing apparatus according to claim 9, wherein in a case where the layer corresponding to the image data having the resolution equivalent to the display resolution does not exist among the plurality of layers, the base layer is a layer corresponding to image data having a resolution lower than the display resolution and closest to the display resolution.

16. The control method for the image processing apparatus according to claim 9, wherein in a case where the layer corresponding to the image data having the resolution closest to the display resolution is the base layer, resolution conversion processing is performed to the base layer so that the resolution of the base layer is substantially equivalent to the display resolution.

* * * * *